(12) United States Patent
Wilcox et al.

(10) Patent No.: US 7,025,015 B2
(45) Date of Patent: Apr. 11, 2006

(54) TRACKING TELESCOPING OUTRIGGER

(76) Inventors: Roger Wilcox, 609 5th Key Dr., Fort Lauderdale, FL (US) 33303; Scott A. Wilcox, 9721 N. New River Canal Rd. 312, Plantation, FL (US) 33324

( * ) Notice: Subject to any disclaimer, the term of this patent is extended or adjusted under 35 U.S.C. 154(b) by 0 days.

(21) Appl. No.: 11/039,004

(22) Filed: Jan. 19, 2005

(65) Prior Publication Data
US 2005/0126465 A1    Jun. 16, 2005

Related U.S. Application Data

(63) Continuation-in-part of application No. 10/620,011, filed on Jul. 15, 2003, now abandoned.

(60) Provisional application No. 60/450,832, filed on Feb. 28, 2003, provisional application No. 60/396,067, filed on Jul. 15, 2002.

(51) Int. Cl.
*B63B 35/14* (2006.01)

(52) U.S. Cl. .................................................. 114/255

(58) Field of Classification Search ................ 114/255; 403/109.1
See application file for complete search history.

(56) References Cited

U.S. PATENT DOCUMENTS

| | | | | | |
|---|---|---|---|---|---|
| 3,072,428 | A | * | 1/1963 | Johnson | 294/2 |
| 3,263,382 | A | * | 8/1966 | Tourtellotte | 52/111 |
| 5,921,196 | A | * | 7/1999 | Slatter | 114/255 |
| 6,006,477 | A | * | 12/1999 | Ko | 403/109.1 |
| 6,213,672 | B1 | * | 4/2001 | Varga | 403/109.2 |
| 6,698,962 | B1 | * | 3/2004 | Wang | 403/109.4 |

* cited by examiner

*Primary Examiner*—Stephen Avila
(74) *Attorney, Agent, or Firm*—Frank J. Benasutti

(57) ABSTRACT

An outrigger has a plurality of telescoping tubes capable of being retracted and extended with respect to one another, and a sleeve between the tubes; and the tubes and sleeve having longitudinal tracking comprising interlocking protrusions and grooves to permit the tubes to be retracted and extended, while preventing substantial relative rotation therebetween. There is a ring attached to the outer tube; by readily detachable screws.

10 Claims, 12 Drawing Sheets

TRACKING TELESCOPING OUTRIGGER

CROSS REFERENCE TO RELATED APPLICATIONS

This application is a continuation-in-part of the filing date of our prior application Ser. No. 10/620,011 filed Jul. 15, 2003 now abandoned, and the provisional application No. 60/450,832, filed Feb. 28, 2003 and the provisional application No. 60/396,067 filed Jul. 15, 2002 which was referenced therein, the disclosures of all of which are incorporated herein by reference as if fully set forth.

BACKGROUND OF THE INVENTION

1. Technical Field

This invention relates to fishing gear for use on a boat and, in particular, to a piece of equipment known as an outrigger for guiding trolling lines outwardly from the boat for luring fish.

2. Description of the Prior Art

In the prior art, sport fishing boats are typically equipped with outriggers for extending fishing and trolling lines out and beyond the wake of the moving boat and into calmer water where the fish are more apt to take the lure or bait. One such outrigger is shown in U.S. Pat. No. 5,921,196, issued Jul. 13, 1999. FIG. 18 thereof is reproduced herein as FIG. 1 (prior art). As shown therein, the outrigger consists of a plurality of telescopic outrigger tubes. At the bottom of the inner tube, there is a spring pin arrangement whereby when the outrigger is properly positioned, a spring urges a pin to pass through aligned holes in the tubes to lock the telescoping tubes in position. This spring pin arrangement is retained as more fully described therein.

Also in this device, a plurality of sleeves serve to position the holes in alignment so that the spring biased pin may pass therethrough. These comprise a sleeve 332 mounted on the outer wall of the inner tube 310, which sleeve ultimately engages a stop assembly and a stop bushing 352.

Mounted about the upper portion of the stop bushing 352 is a guide ring 354. All of these parts are permanently retained in their respective positions by epoxy or other type of glue. Thus, the bushing 352 and ring 352 are permanently fixed on the end of the outer tube. The same is true on the ring 342 which is permanently fixed to the inner tube 310.

Thus, this device provides no ready means for disassemblement for cleaning and/or repairs.

Furthermore, this type of device does not provide a sure means to align the internally mounted button with the hole in the external tube to fix the tubes in the fully extended position.

U.S. Pat. No. 6,006,477 teaches an umbrella rod structure of multiple tubes with inter locking grooves to prevent rotation and thereby, automatically align the stop buttons in an extended position. Noted therein are prior art figures denominated 1 and 2. These are reproduced herein and renumbered 1*a* (prior art) and 2*a* (prior art) respectively. As shown and described therein, "the inner tube (1) extends into the outer tube (2) with the recessed groove (23) of the outer tube (2) sliding over the elongated guide groove (12) of the inner tube (1)." Column 2, lines 12 to 15.

Whatever this device's utility is with regard to umbrellas, it lacks an interspersed guide sleeve between the telescoping tubes. Such a guide sleeve is useful in telescoping outriggers; as will become apparent from the following description of the present invention.

SUMMARY OF THE INVENTION

We have invented an improved outrigger of the telescoping type which can be readily disassembled for cleaning and repair. This outrigger provides a means for retaining the spring; which means can be removed and cleaned. It also provides a means for positively tracking the telescoping sections with respect to one another so that they cannot be substantially rotated. This provides a means such that such that the locking button always pops through the holes in the telescoping sections to lock the sections together in the extended position. In particular, we have invented an outrigger comprising a plurality of telescoping tubes capable of being retracted and extended with respect to one another, and further comprising at least one outer tube and one inner tube; a sleeve juxtaposed between the inner and outer tubes; said sleeve having a first longitudinally extending tracking means thereon; said tubes having second longitudinal tracking means thereon coacting with said first tracking means to permit the tubes to be retracted and extended, while preventing substantial relative rotation therebetween; and locking means to lock the tubes in an extended position.

DESCRIPTION OF THE PREFERRED EMBODIMENTS

Figure 1:
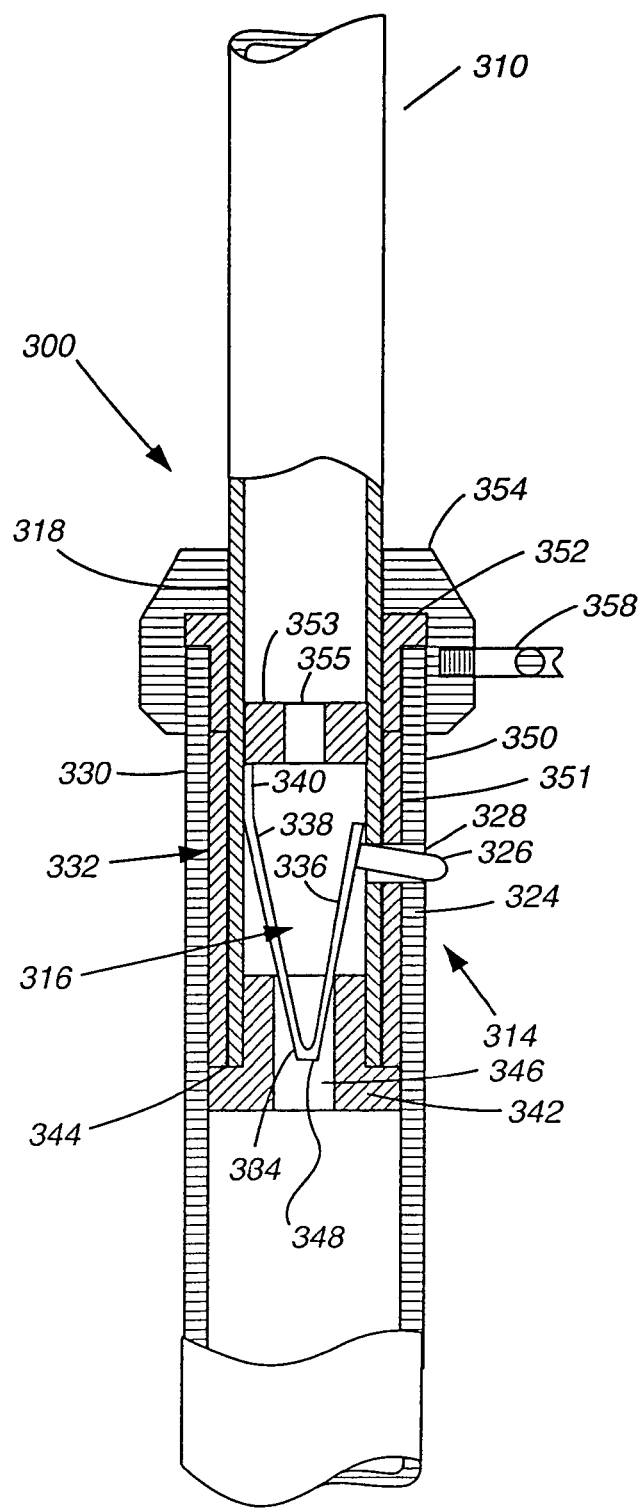
FIG. 1 is a view from a prior art outrigger patent shown partially broken away and in section.
Figure 1A:
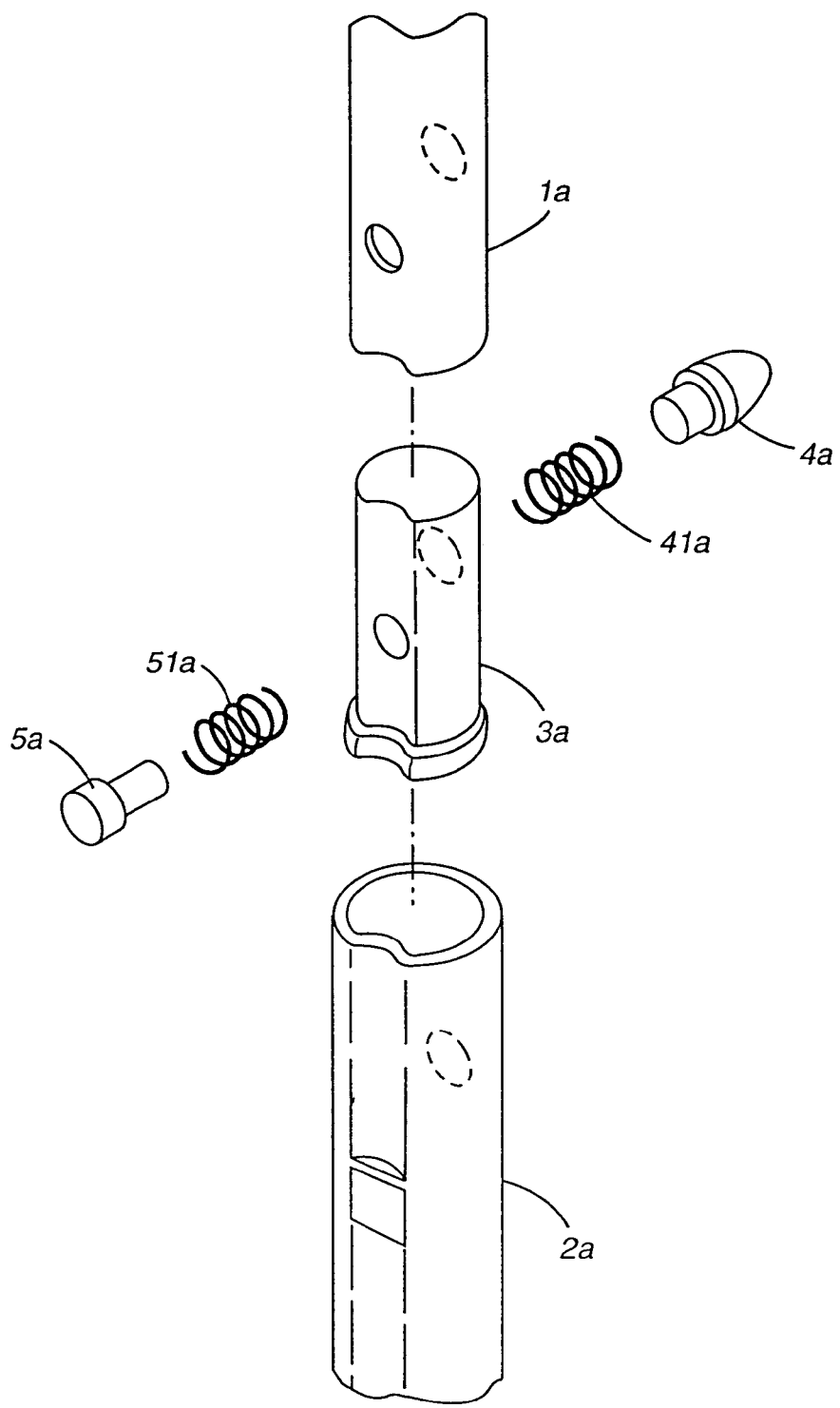
FIG. 1*a* is a view from another prior art patent shown broken away.
Figure 2:
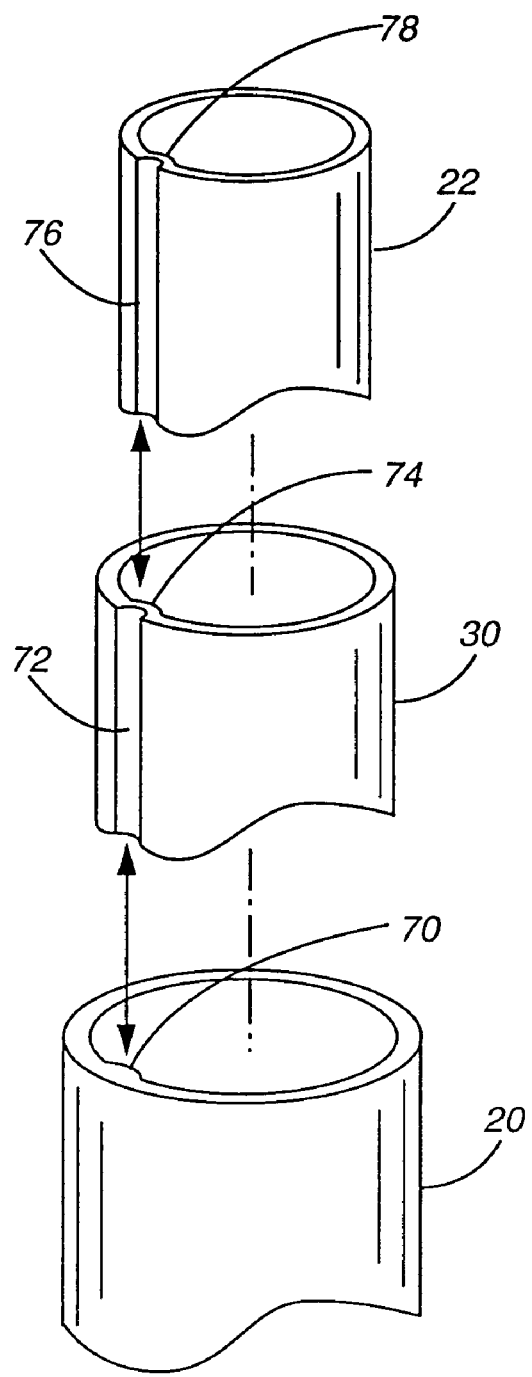
FIG. 2 is an exploded perspective view of portions of an outrigger in accordance with our invention.
Figure 2A:
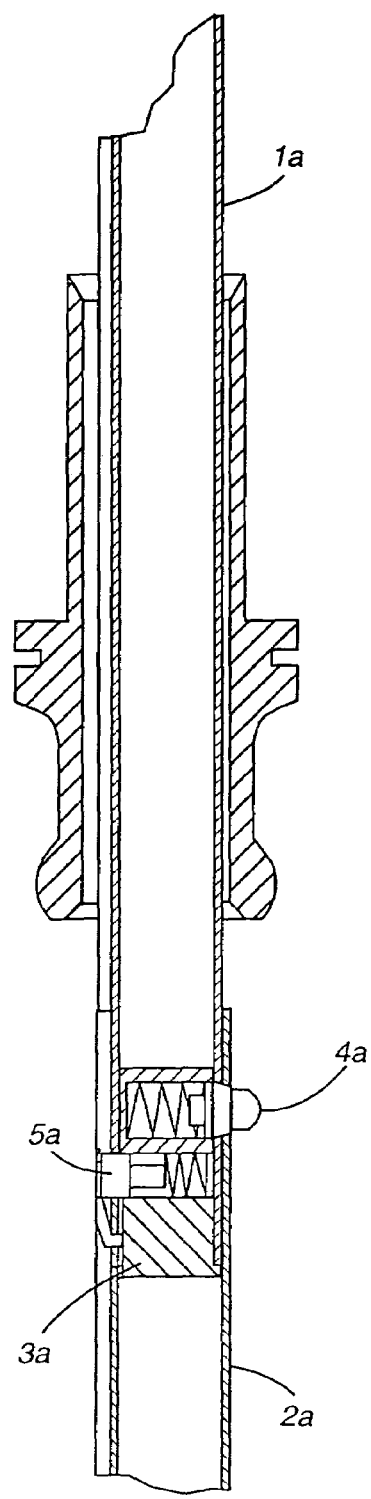
FIG. 2*a* is a view from another prior art patent shown broken away.
Figure 3:
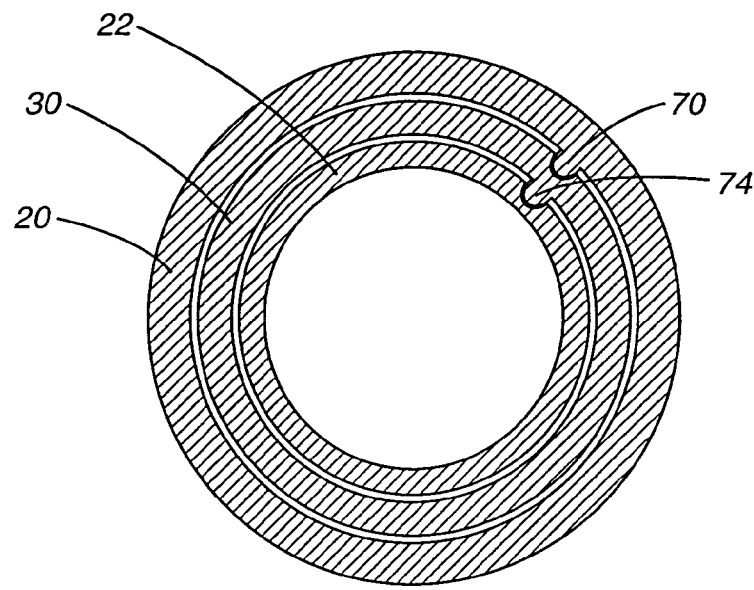
FIG. 3 is a cross section view of a portion of the outrigger shown in accordance with our invention.
Figure 5:
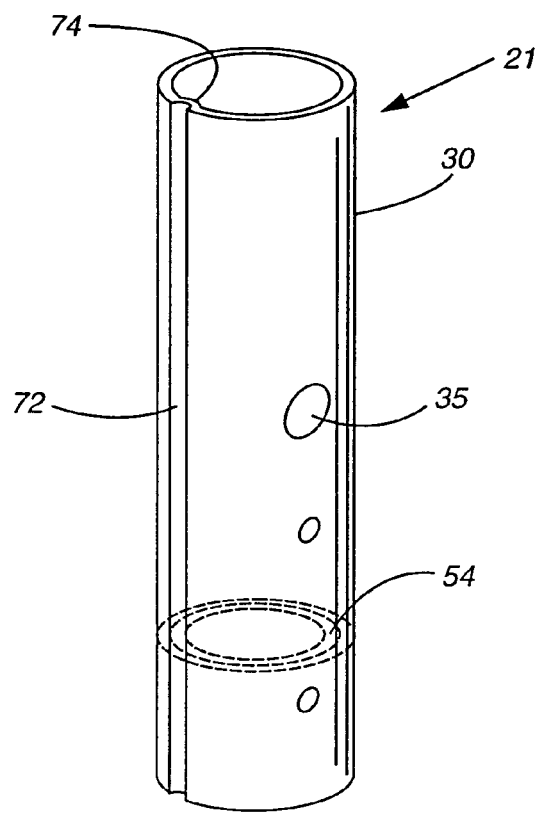
FIG. 5 is a perspective view of a portion of an outrigger in accordance with our invention.

Referring to the Figures, a portion of an outrigger is shown in FIGS. 2 and 3 and comprises an outer tube 20 telescoping with an inner tube 22. Our invention provides a positive means for tracking the tubes as they are manipulated from the retracted to the extended position. This tracking means consists of a longitudinally extending protrusion running the length of an outer tube 20 and a longitudinally extending groove running the length of a mating sleeve 30. These parts are shown, for example, in FIGS. 2, 3 and 5, wherein the protrusion is illustrated at 70 and groove is shown at 72.

Figure 4:
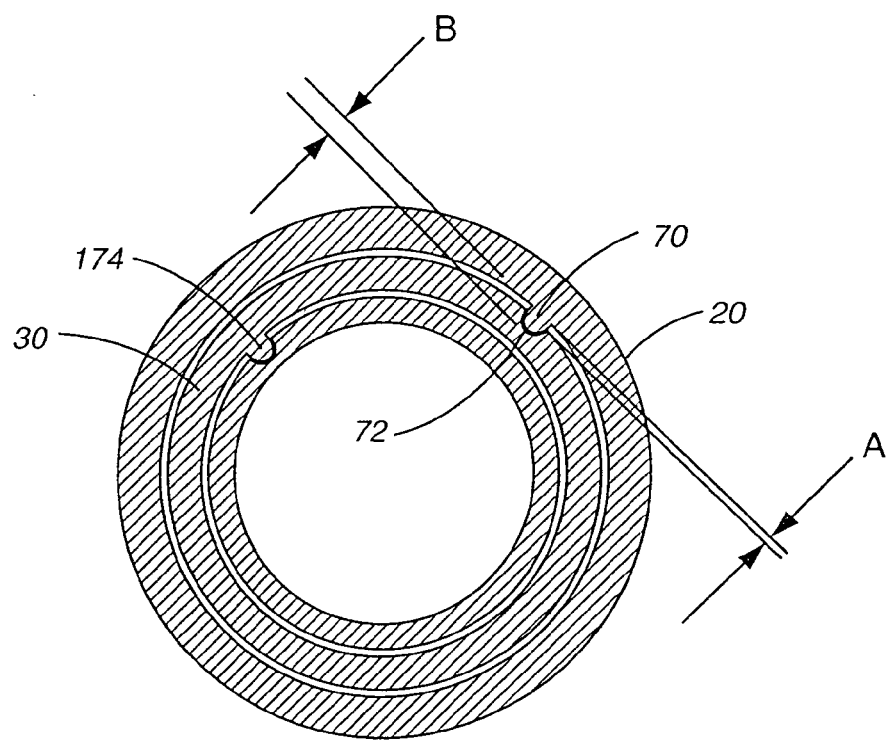
FIG. 4 is a sectional view of a portion of an outrigger in accordance with an alternate embodiment of our invention.

An additional longitudinally extending protrusion on the inner wall of the sleeve 30 is provided at 74, FIGS. 2 and 3, to mate with an additional groove 76, in the next juxtaposed tube 22. These protrusions are shown in line radially in FIG. 3. However, they need not be so aligned, as shown in FIG. 4 at 70 and 174. Each protrusion must be in line with its mating groove. The protrusions are designed so that when co-acting with the grooves, they do not permit the tubes to be substantially rotated with respect to one another; but merely to be extended with respect to one another. Thus, the clearance space which permits the tube and sleeve to slide back and forth with respect to one another, must, in accordance with our invention, be less than the full extension of the protrusion through the clearance space and into its mating groove. This is illustrated in FIG. 4 wherein the sliding action is provided by the clearance space "A"; but that sliding action clearance space "A" is less than the distance which the protrusion 70 extends from the wall of the tube 20 and fully into its mating groove 72 in the sleeve 30; that distance being identified by the letter "B".

Figure 8:
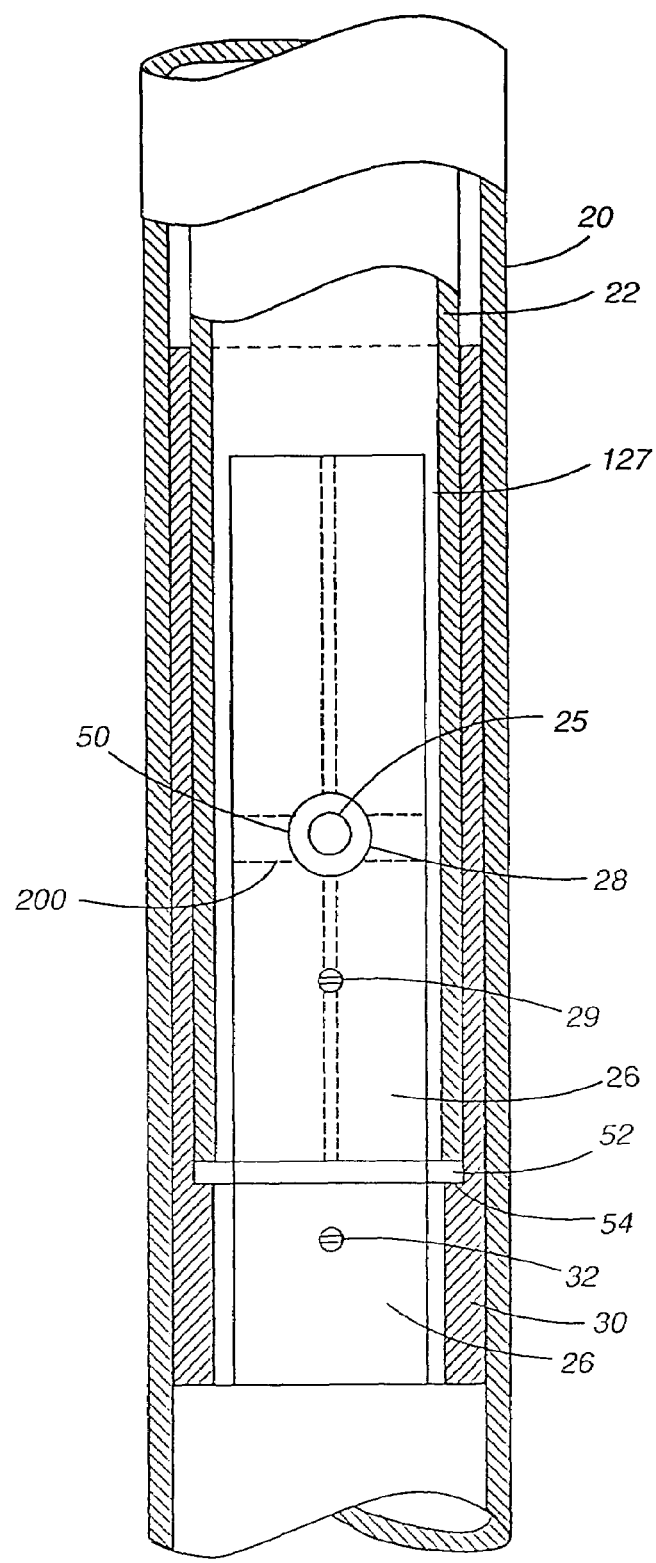
FIG. 8 is a sectional view of a portion of an outrigger in accordance with our invention.

These protrusions and grooves are shown in partial section in FIG. 8.

Figure 7:
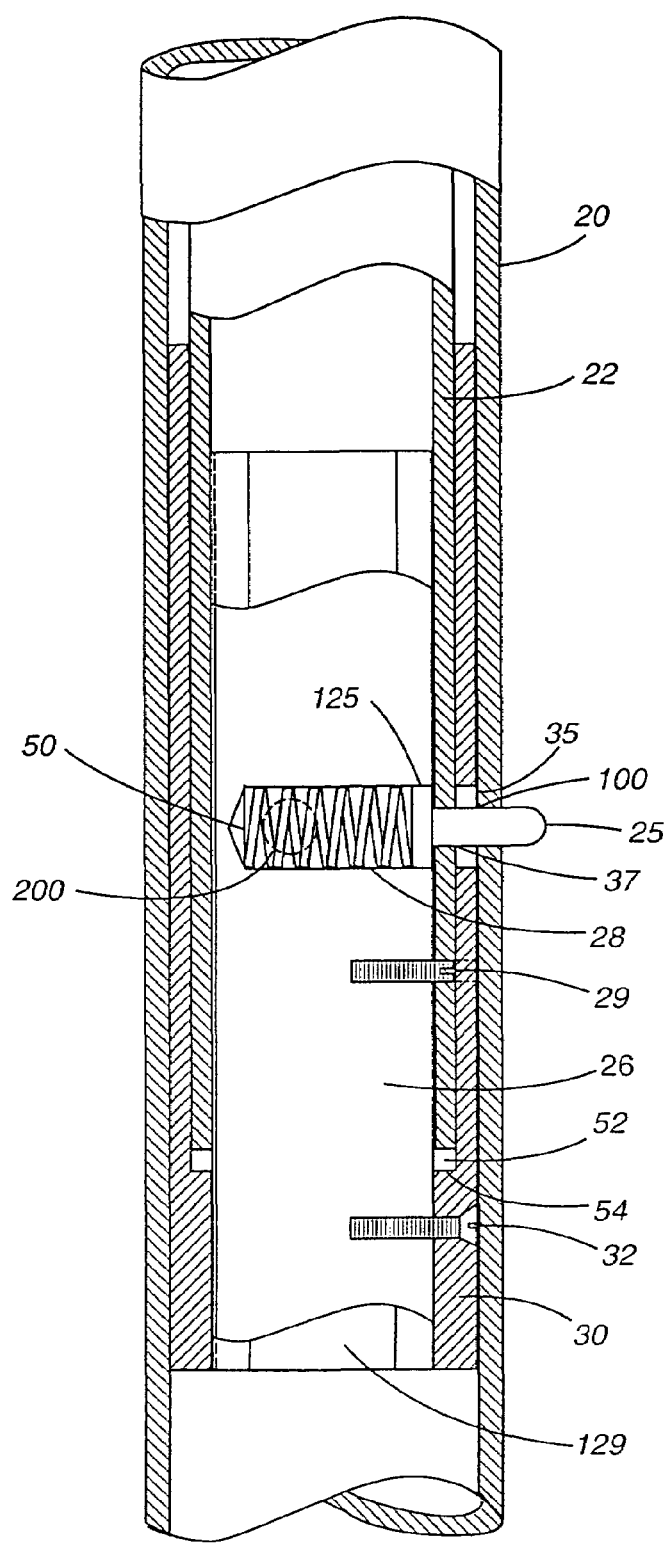
FIG. 7 is a sectional view of a portion of the outrigger in accordance with our invention.

This tracking is for the purposes of alignment of the button 25, FIG. 7, with the hole 100 in the outer tube 20. Referring to FIG. 7, the bottom of the inner tube 22 sits against a flange 52 of the retainer 26. The retainer 26 has a hole 28 therein retaining a spring 50 biasing the button 25 outwardly. Thus, when the inner tube 22 is moved from the retracted condition to the extended condition, the tracking of protrusions and grooves provides the means such that the button 25 will always pass through the hole 100 and lock the parts together.

In accordance with our invention, one track is sufficient; however, it is within our invention to provide more than one track and protrusion, or longitudinal guide means, if so desired.

In order to retain the button 25 and have it tract with the tubes, I have provided a retention means designated generally 21 in FIGS. 5, 6, 7 and 8 which comprises a sleeve 30 and a retainer 26.

Figure 6:
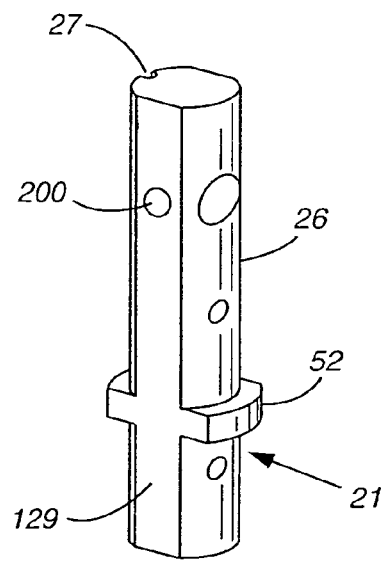
FIG. 6 is a perspective view of a portion of the outrigger in accordance with our invention.

The retainer 26 has flat, longitudinally extending surfaces thereon, such as at 129, FIGS. 6 and 7. This configuration creates a space 127 between the retainer 26 and the internal surface of the sleeve 30; which space allows for water and debris to readily flow therethrough and be discharged from the bottom of the sleeve 30.

To retain the retainer 26 within the sleeve 30, I have provided a set screw 32 which is threaded into the retainer 26 through the wall of the sleeve 30.

The sleeve 30 is in sliding engagement with the outer tube 20.

The sleeve 30 has a groove 72 (FIG. 5) on the outside to mate with the protrusion 70 on the inside of the outer tube 20.

The inner wall of the sleeve 30 has a longitudinally extending protrusion 74 which mates with the groove 76 in the outer wall of the tube 22.

The outer wall of the retainer 26, FIG. 6 has a longitudinally extending groove 27 to embrace the protrusion 78 on the inner wall of the inner tube 22, FIG. 2.

The retainer 26 has a flange 52 as an integral part thereof. This flange 52 rests upon an internal shoulder 54 in the sleeve 30, FIG. 5.

The inner tube 22 is also connected to the retainer 26 by a set screw 29.

The inner tube 22 can be removed from the outer tube 20. When it is removed, sleeve 30 and retainer 26 stay attached to the inner tube 22. In the removed condition, the set screw 32 can be backed off to allow the sleeve 30 to be disengaged from the tube 22. Also the screw 29 can be backed off to allow the retainer 26 to be removed from the inner tube 22 and cleaned. This also allows replacement of the spring 50 or the button 25, if necessary.

The set screws 29 and 32 alternatively may be flat head screws and countersunk in the wall of sleeve 30.

The button 25 passes through a hole 35 in the sleeve 30. It also passes through a hole 37 in tube 22. To keep the button from being ejected through the hole 37, the button is provided with a flange 125 which extends beyond the periphery of the hole 37. Thus, when the spring 50 urges the button outwardly, the flange 125 will engage the inner wall of the tube 22 and prevent the button from being ejected from the tube.

Laterally extending drainage holes 200 are provided communicating through the flat surfaces 129 of the retainer 26 to the hole 28 which holds the spring 50. Thus, if debris gets into this area, it can readily exit through the drainage holes 200.

Figure 9:
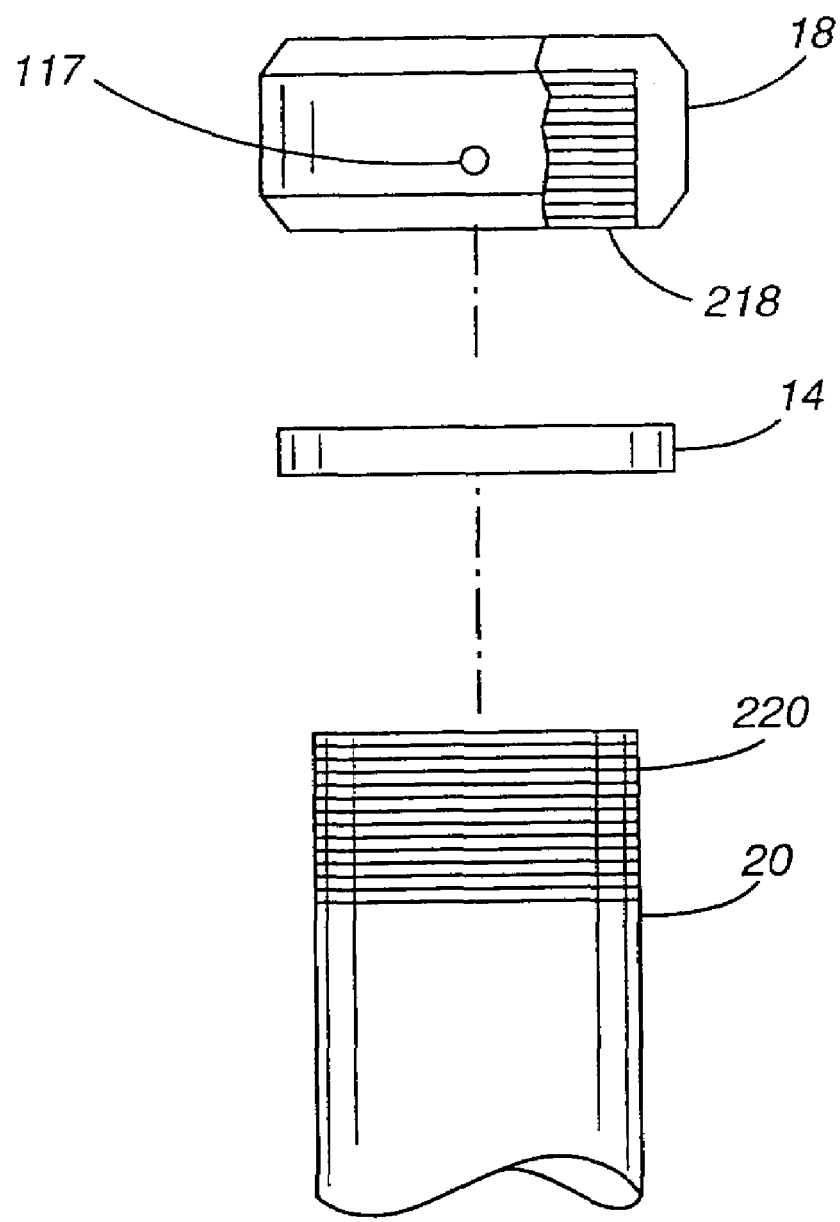
FIG. 9 is an exploded perspective view of portions, partially broken away, of a telescoping outrigger in accordance with our invention.

In FIG. 9, the outer tube 20 is shown in an exploded view with a washer 14 positioned to engage the upper outside end surface of the outer tube 20.

Mounted about the washer 14 is a guide ring 18 for retaining the washer 14 in position at the outer end of the tube 20.

The inner diameter hole through the washer 14 is in sliding engagement with the outer surface of the inner tube 22 (as shown at 120, FIG. 13) to guide the tube 22 while it is being retracted and extended.

Figure 10:
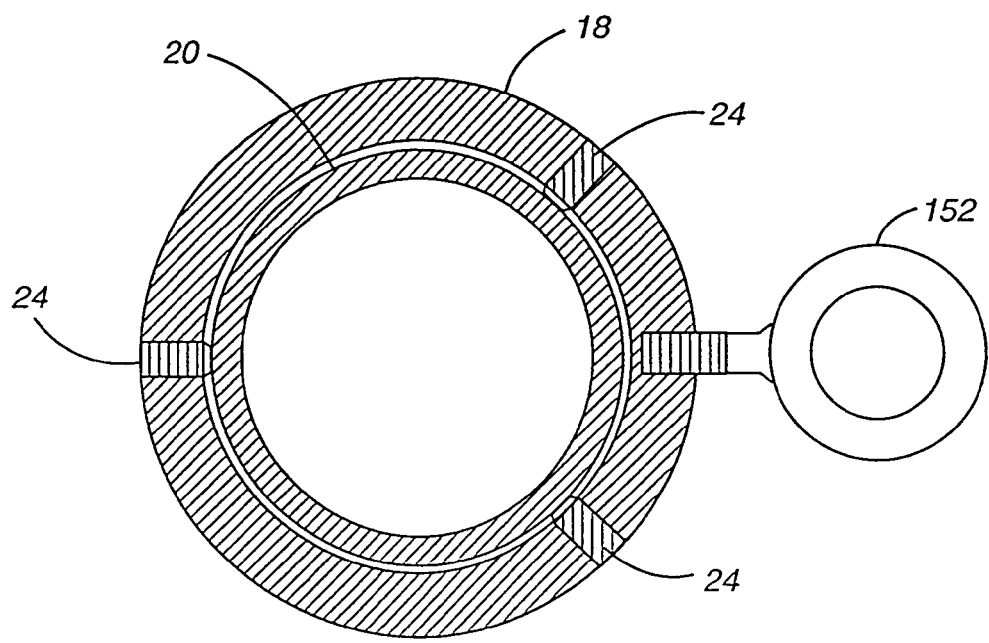
FIG. 10 is a full view and partial section of a portion on a telescoping outrigger in accordance with our invention.

A plurality of set screws 24, FIG. 10, are threaded through the guide ring 18 to engage the surface of the outer tube 20 when fully assembled. The set screws are preferably cup-shaped at their engaging ends so as to provide a ring of contact against the outer surface of the outer tube. Cone point set screws could be used, but might have a tendency to score the surface of the tube and eventually create problems if they were repeatedly assembled and disassembled. Positioning a plurality of these set screws at various angles (such as 120 degrees, FIG. 10) about the circumference of the guide ring 18 provides not only sufficient strength to retain the guide ring on the outer tube; but also to prevent distortion of the outer tube. Thus, we have provided a retention means for fixedly attaching the washer 14 and retaining ring 18, yet permitting the outrigger to be disassembled.

As shown in FIG. 10, the ring 18 is spaced from the outer wall of the tube 20. The washer 14, however, is not so spaced; but rather is in abutting engagement with the outer end surface of tube 20.

It is preferable to have the holes for the said screws 24 positioned closer to the vertical bottom of the retaining ring 18, as shown at 117 in FIG. 9. This gives a sure engagement with the tube 20; since the washer 14 occupies the upper portion of the inner cavity of the retaining ring 18.

To provide a means of readily disassembling the outrigger, we have provided threads 220 on the tube 20 which mate with threads 218 on the ring 18 as shown in FIG. 9.

In operation, the tubes can be taken apart by backing off the set screws 24, FIG. 10, so that the ring 18 is disengaged from the outer tube 20.

Figure 11:
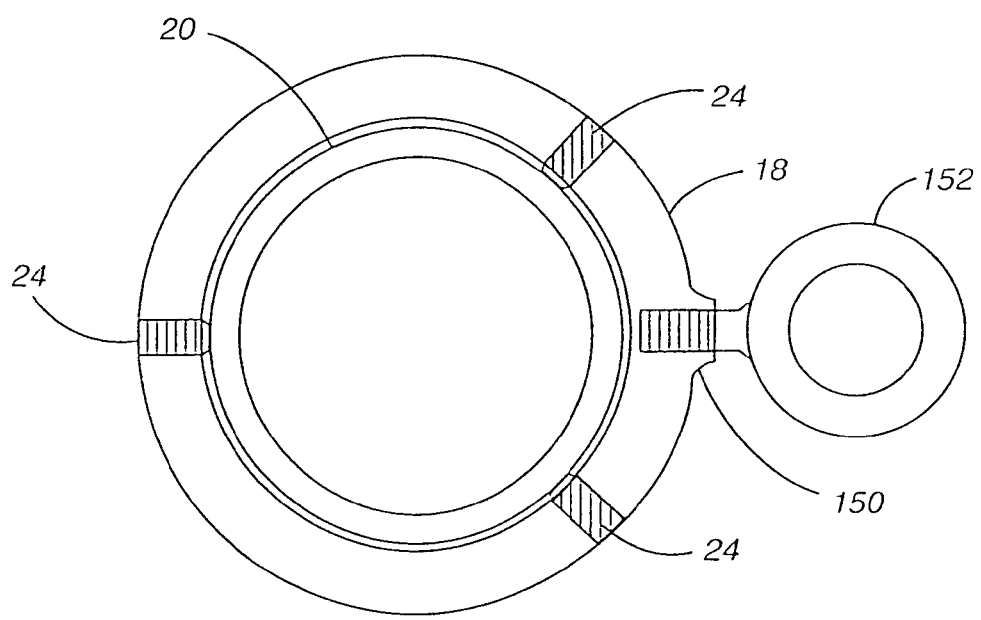
FIG. 11 is a view of parts of a telescoping outrigger in accordance with an alternate embodiment of our invention; some shown in section and some shown in full lines.

If desirable for reinforcement purposes, a portion of the ring 18 can be thickened to accommodate the threaded eye bolt 152; as shown at 150 in FIG. 11.

Figure 12:
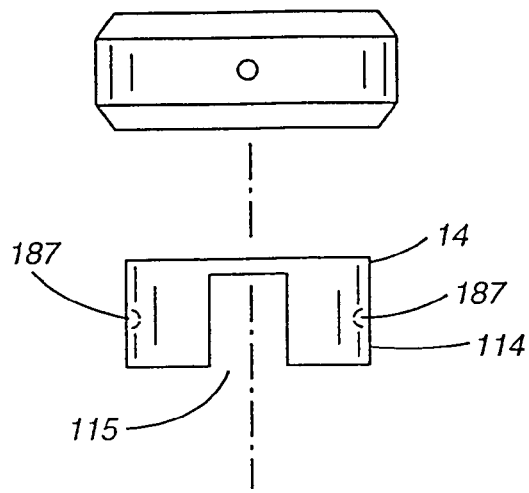
FIG. 12 is an exploded perspective view of portions of an outrigger in accordance with an alternate embodiment of our invention.
Figure 12:
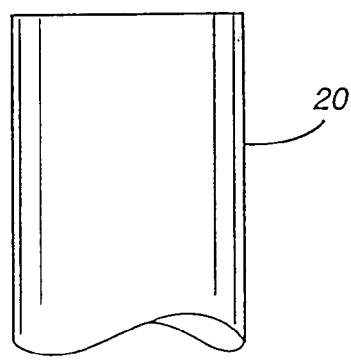
Figure 13:
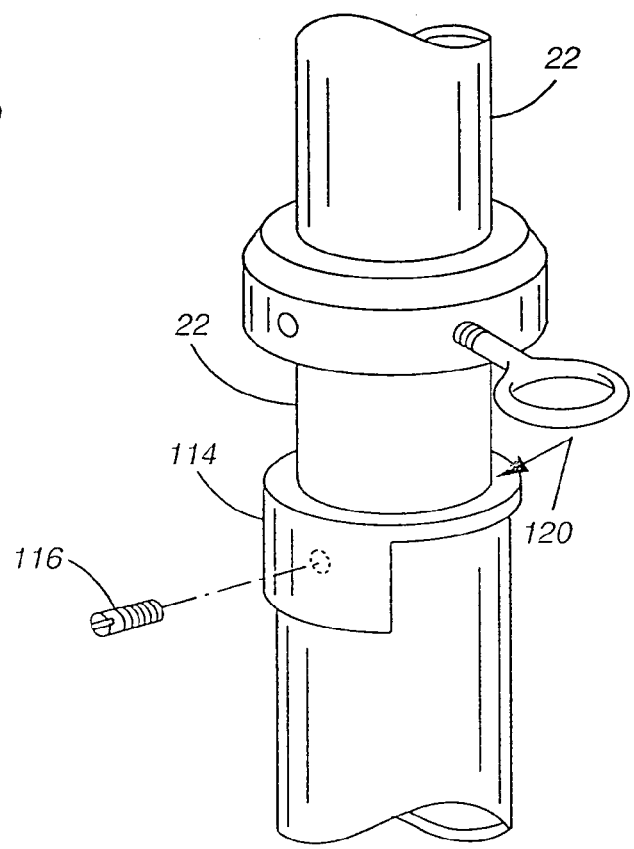
FIG. 13 is a perspective view partially exploded of a portion of an outrigger in accordance with an alternate embodiment of our invention.
Figure 14:
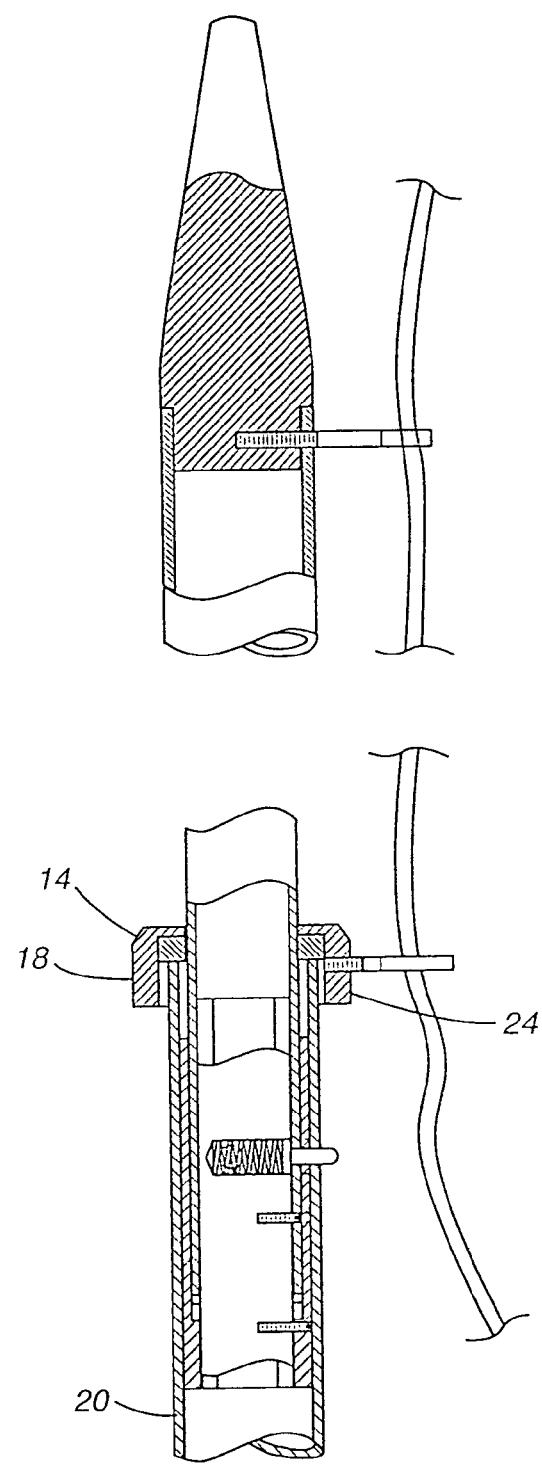
FIG. 14 is an exploded view partially in full lines and partially in section of an assembled outrigger in accordance with our invention.

If desirable, the washer 14 may include a thin downwardly depending section 114, FIG. 12, embracing the outside of the outer tube 20, as shown in FIG. 13. In such embodiment, indentations 187 may be provided to allow the set screws to push against this thin depending section 114 and force it against the outer wall of the tube 20. To accommodate the clamping movement, the downwardly depending skirt 114 may be split, as at 115. Alternatively, the skirt can have holes instead of the indentations 187 to allow the set screws to pass through this skirt and onto the outer wall of the outer tube, as at 116 in FIG. 13.

What is claimed is:

1. An outrigger comprising a plurality of telescoping tubes capable of being retracted and extended with respect to one another, and further comprising at least one outer tube and one inner tube;
   a sleeve juxtaposed between the inner and outer tubes;
   said sleeve having a first longitudinally extending tracking means thereon;
   said tubes having second longitudinal tracking means thereon coacting with said first tracking means to permit the tubes to be retracted and extended, while preventing substantial relative rotation therebetween; and
   locking means to lock the tubes in an extended position.

2. The outrigger of claim 1 wherein the outer tube has an inwardly and longitudinally extending protrusion;
   the sleeve has a longitudinally extending groove co-acting with said protrusion;
   the sleeve has an inwardly and longitudinally extending protrusion;
   the inner tube has a longitudinally extending groove co-acting with the protrusion on the sleeve;
   the inner tube has a inwardly and longitudinally extending protrusion; and
   the locking means further comprises a retainer having a longitudinally extending groove therein co-acting with the protrusion on the inner tube to prevent substantial rotation therebetween; and
   the retainer, the tubes and the sleeve have transfer holes therein which are aligned in at least one extended condition; and
   the retainer has a hole therein in which there was positioned a spring-biased button biased to extend through said holes in said extended condition.

3. The outrigger of claim 2 wherein fastening means are provided to permit retention and disengagement of the retainer within said inner tube.

4. The outrigger of claim 2 wherein fastening means are provided to permit retention and disengagement of the retainer with said sleeve.

5. The outrigger of claim 1 wherein a guide means is provided on said outer tube co-acting with said inner tube to guide said inner tube during extension and retraction.

6. The outrigger of claim 5 wherein said guide means comprises a washer mounted on the end of said outer tube by means of a guide ring fastened to said outer tube.

7. The outrigger of claim 1 having retention means engaging said outer tube and providing a means for disengagement from said outer tube whereby said tubes may be retained in their assembled condition and also disassembled.

8. The outrigger of claim 7 wherein said retention means comprises threads on said outer tube.

9. The outrigger of claim 8 wherein said retention means comprises a ring having threads engaging the threads on said outer tube.

10. The outrigger of claim 7 wherein said retention means comprises a ring embracing the outer tube with a wall; said ring having at least one screw passing through said wall and engaging said outer tube.

* * * * *